(12) United States Patent
Brombach et al.

(10) Patent No.: US 11,355,933 B2
(45) Date of Patent: Jun. 7, 2022

(54) METHOD FOR FEEDING ELECTRICAL POWER INTO AN ELECTRICAL SUPPLY NETWORK

(71) Applicant: Wobben Properties GmbH, Aurich (DE)

(72) Inventors: Johannes Brombach, Berlin (DE); Ingo Mackensen, Aurich (DE); Florian Stelmaszek, Hasbergen (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/225,010

(22) Filed: Apr. 7, 2021

(65) Prior Publication Data

US 2021/0320496 A1 Oct. 14, 2021

(30) Foreign Application Priority Data

Apr. 9, 2020 (EP) .................................... 20168873

(51) Int. Cl.
*H02J 3/18* (2006.01)
*H02J 3/38* (2006.01)

(52) U.S. Cl.
CPC ................ *H02J 3/18* (2013.01); *H02J 3/381* (2013.01); *H02J 2300/28* (2020.01)

(58) Field of Classification Search
CPC ...... H02J 3/18; H02J 3/381; H02J 3/38; H02J 2300/28
See application file for complete search history.

(56) References Cited

U.S. PATENT DOCUMENTS 10,794,364 B2 10/2020 Brombach
2019/0170117 A1 6/2019 Letas

FOREIGN PATENT DOCUMENTS

| CN | 109494785 A | 3/2019 |
|---|---|---|
| EP | 3073631 A1 | 9/2016 |
| EP | 3496227 A1 | 6/2019 |
| WO | 2017/129749 A1 | 8/2017 |

*Primary Examiner* — Robert L Deberadinis
(74) *Attorney, Agent, or Firm* — Seed IP Law Group LLP

(57) ABSTRACT

Provided is a method for feeding electrical power into an electrical supply network at a network connection point by means of a converter-controlled infeed apparatus, in particular by means of a wind power system. The electrical supply network has a network voltage having a network frequency and a network phase angle rotating with the network frequency and is characterized by a rated network frequency. The infeed is effected by means of a converter operating in a current-impressing manner. An infeed current is generated by the converter with an infeed phase angle rotating with the network frequency for the purpose of controlling the infeed phase angle. A guide angle rotating with the network frequency is predefined. The guide angle has a predefinable lead angle with respect to the network phase angle such that the guide angle lags the network phase angle by the lead angle.

15 Claims, 3 Drawing Sheets

METHOD FOR FEEDING ELECTRICAL POWER INTO AN ELECTRICAL SUPPLY NETWORK

BACKGROUND

Technical Field

The present invention relates to a method for feeding electrical power into an electrical supply network. The invention also relates to a converter-controlled infeed apparatus, in particular a wind power system, for carrying out such a method. In this case, a wind power system can denote a single wind power installation, or a wind farm comprising a plurality of wind power installations.

Description of the Related Art

Wind power installations are known. They feed electrical power from wind into an electrical supply network. A plurality of wind power installations are often combined in a wind farm. Wind power installations are increasingly also being used for backup of the electrical supply network. Previous network control strategies and network operation management strategies have predominantly been oriented toward the physical properties of conventional infeed apparatuses, namely in particular large powerplant blocks with synchronous machines. Wind power installations can or must in the future perform tasks of such conventional infeed apparatuses. In this case, the previous network control strategy and network operation management strategy may possibly no longer be appropriate, or should at least be revised or adapted.

In electrical supply networks with a high converter penetration, voltage-impressing power electronic infeed apparatuses are required under certain circumstances. Almost all power electronically coupled infeed apparatuses nowadays feed a current into the electrical supply network, that is to say operate in a current-impressing manner. In this case, a voltage-dependent reactive power control can be implemented and a frequency-dependent active power control or a phase angle control can be provided. However, even today it can be assumed that only a small percentage of these infeed apparatuses must actually instantaneously retain the voltage and phase. That is to say that only a small proportion must carry out a voltage control dependent on the reactive power and a frequency control dependent on the active power. Despite the need for voltage-impressing power electronic infeed apparatuses, therefore, only few converter-controlled infeed apparatuses will actually have to be equipped with a voltage-impressing manner of functioning.

It has been recognized, in particular, that although voltage-impressing power electronic infeed apparatuses may have good backup properties, they are not optimal in situations in which a backup does not matter. That means that such voltage-impressing power electronic infeed apparatuses often do not operate optimally during most of their time of operation, since as a rule the demanded or required backup function is used only rarely.

The document WO 2017/129749 A1 discloses a method for feeding electrical power into an electrical supply network which can back up an electrical supply network. In that case, a reference angle with reference frequency is predefined with the aid of a reference system, wherein the reference system is tracked to the behavior of the network voltage in a delayed manner in order thereby to produce effects similar to those in the case of a directly coupled synchronous generator. However, the solution in this cited document predefines an output voltage and operates in a voltage-impressing manner. Consequently, desired backup effects can be achieved by the use of this voltage-impressing method or the wind power installation operating correspondingly in a voltage-impressing manner, but with the price of having to operate in a voltage-impressing manner.

Operating in a voltage-impressing manner, that is to say effecting infeed in a voltage-impressing manner, at any rate if a converter system is used for this purpose, may have the following disadvantages. Particularly in the case of permanent voltage impressing, the converter system and the electrical drive train of a wind power installation have to be overdimensioned for the possible occurrence of transient power requirements that may arise as a result of the voltage-impressing infeed. That can be explained by the fact that as a result of the voltage-impressing infeed, the voltage is also predefined in terms of the phase and attempts are also made to maintain this. As a result, the voltage phase is also maintained. That is already attempted at the beginning, that is to say, when a phase, which can also be referred to as phase angle, begins to change. That may also be referred to as initial retention of the phase. In order to retain the phase, a large amount of control energy has to be expended, which becomes apparent as direct power exchange. The initial retention of the phase thus leads to a direct power exchange. In order to be able to realize that, the aforementioned overdimensioning has to be implemented.

Besides the necessary overdimensioning, additional losses also arise since every change, however small, in the network is damped and an increase in the power exchange with the network occurs with energy fed in remaining constant to the greatest possible extent.

In the European priority application the European Patent Office has searched the following prior art documents: EP 3073631 A1; EP 3496227 A1 and CN 109494785 A.

BRIEF SUMMARY

As provided herein, the voltage-impressing properties of power electronic infeed apparatuses are used while as much as possible avoiding the disadvantages of voltage-impressing power electronic infeed apparatuses A method is proposed. This method for feeding in electrical power thus feeds into an electrical supply network at a network connection point. This is effected by means of a converter-controlled infeed apparatus, in particular by means of a wind power system. A converter-controlled infeed apparatus may also be referred to synonymously as a converter-based infeed apparatus or as a converter-using infeed apparatus. It is an infeed apparatus which feeds into the electrical supply network exclusively or at least predominantly using a frequency converter or a frequency inverter. For wind power installations, this includes a full scale converter concept and infeed by means of a doubly fed asynchronous machine, also referred to as a doubly fed induction generator (DFIG). The term wind power system here encompasses both a single wind power installation and a wind farm comprising a plurality of wind power installations. The infeed is thus effected by means of a wind power installation or a wind farm, or some other converter-controlled infeed apparatus.

Moreover, the network connection point is arranged at a network section of the electrical supply network and the electrical power is fed into the network section via the network connection point. Consideration is thus also given to a network section which, e.g., by means of a transformer or simply an electrical connection, can be connected to the rest of the electrical supply network and/or can be connected to at least one further network section. In particular, a plurality of infeed apparatuses are connected to the network section, with a cumulative rated power of at least 10 MW, in particular at least 100 MW. In particular, a network section, which can also be referred to as a local network section, is understood to mean a section of the electrical supply network which amounts to a maximum magnitude of 10% of the entire electrical supply network. This magnitude relates in particular to the active power of the network section and of the electrical supply network that is cumulatively fed in or able to be fed in.

In this case, the electrical supply network has a network voltage having a network frequency and a network phase angle rotating with the network frequency. The electrical supply network is moreover characterized by a rated network frequency, which can be in particular 50 Hz or 60 Hz. Every electrical supply network which has an electrical AC voltage, having a substantially sinusoidal profile, has a rotating network phase angle. The latter can for example be defined with respect to one of three phases of the electrical supply network and be defined such that it has the value zero if the instantaneous value of the voltage of the relevant phase has a positive zero crossing. That would then be in line with the definition of a sine function. However, consideration is also given to taking as a basis a phase angle in accordance with a transformation of the three phase voltages of the electrical supply network in a network system. The method of symmetrical components is given particular consideration here. What is important, in particular, is that the same definition is analogously taken as a basis for the phase angles that also follow, in particular for the infeed phase angle also described below. In this respect, it is important here that this network phase angle serves for orienting the infeed and in this respect the description of the network and the description of the current to be fed in are based on the same form of description.

The infeed is thus effected by means of a converter. Such a converter here is representative of a frequency converter or an inverter, and also of arrangements interconnected from a plurality of individual frequency converters or inverters. In particular, consideration is given to configuring such a converter as a converter unit in which a plurality of frequency converters or inverters are connected in parallel. Infeed by means of a DFIG is also taken into consideration.

What is also important here is that the converter operates in a current-impressing manner. Operating in a current-impressing manner is a technical term and means that the converter operates such that it predefines a current for infeed depending on an external voltage. By way of example, this can be effected by means of a tolerance band method, in which a tolerance band is predefined for the current to be fed in. The generated current is then detected at the output of the converter, optionally also at the output of a network inductor assigned to the converter. If this detected current then reaches a limit of the tolerance band, this triggers in the converter a switching process that causes the current to be kept in the tolerance band.

The electrical power is fed in, moreover, such that an infeed current with an infeed phase angle rotating with the network frequency is generated by the converter. Such an infeed phase angle can be predefined for example as a reference angle in a reference system. For this purpose, the reference system can rotate with the network frequency, such that the reference angle in the reference system is substantially constant, while the infeed phase angle rotates with the network frequency, that is to say changes continuously. The network frequency can be measured and is usually also measured continuously in order to fulfil network backup tasks, if appropriate. By way of example, depending on said infeed phase angle or according to said infeed phase angle, the tolerance band mentioned can be predefined if a tolerance band method is used. However, the infeed phase angle can also be used in a different way in order for example to predefine in a different way a sinusoidal profile of the current to be fed in. In particular, it is thereby possible to predefine a current phasor as a space vector for the current to be fed in.

In order to control the infeed phase angle, a guide angle rotating with a network frequency is predefined. The guide angle has a predefinable lead angle with respect to the network phase angle, such that the guide angle lags the network phase angle by the lead angle. The lead angle is thus predefined such that the guide angle lags the network phase angle.

The lead angle is thus chosen such that the infeed apparatus effects infeed in an overexcited manner. The relationships of the angles mentioned will be explained later by way of example with reference to FIG. 3. The description of the angles, insofar as it matters at all, is oriented to the generator reference arrow system. That applies generally, not just to FIG. 3. The lead angle, in terms of the absolute value, will maximally assume the value 90°, but is preferably a maximum of 40°.

The situation could be described such that the network voltage is described by a voltage phasor which rotates with the network frequency, and the infeed current can be described by a current phasor which likewise rotates with the network frequency. In addition, an auxiliary phasor can also be described, which rotates with the network frequency and has the guide angle. The lead angle thus describes the angle between the voltage phasor and the auxiliary phasor. In ideal steady-state operation, the current phasor can correspond to the auxiliary phasor.

The lead angle can thus be 20°, for example, and the guide angle will then continuously lag the network phase angle by said 20°, or the auxiliary phasor lags the voltage phasor by said 20°.

The infeed phase angle is oriented to said guide angle. For this purpose, the infeed phase angle is tracked to the guide angle with a delay dynamic range. In this case, the delay dynamic range is configured such that in steady-state operation, when the guide angle and the network phase angle thus rotate uniformly with the network frequency, a difference angle between the infeed phase angle and the guide angle is corrected to zero. In said steady-state operation, the infeed phase angle thus corresponds to the guide angle. The infeed phase angle correspondingly lags the network phase angle by the value of the lead angle.

It has thus been recognized that the difference between network phase angle and guide angle defines the static operating point of the converter. Thus, in a simplified explanation, the guide angle represents the current reference of a converter. If there is a change in the voltage, frequency and/or the network phase angle, the guide angle is correspondingly adapted.

In transient operation, the infeed phase angle is tracked to the guide angle with a variable deviation. Transient operation is present when a time derivative of the guide angle changes, that is to say when the guide angle no longer rotates uniformly with a fixed frequency. In this case, therefore, the network phase angle also no longer rotates uniformly with a fixed network frequency. That can mean that the network frequency varies, and/or that can also mean that the network phase angle jumps.

What is achieved by this delayed tracking in transient operation is that the difference between the infeed phase angle and the network phase angle in said transient region firstly corresponds to the lead angle. The situation that a different difference angle between infeed phase angle and network phase angle occurs in said transient case compared with steady-state operation is thus deliberately utilized here. Said difference angle can be greater or less than in steady-state operation, depending on the situation in the network.

It has been recognized here that under specific operating conditions current-impressing converter-based infeed apparatuses can exhibit an instantaneous behavior backing up a network. In such a case, such converters then act like voltage-impressing converters. This effect can be utilized with the proposed method.

It is thus proposed to use the phenomenon described for instantaneously providing an instantaneous reserve and/or voltage impressing. What is achieved by the method is that the converters are driven in overexcited operation for frequency backup and/or voltage impressing. Said overexcited operation means that more power is provided in the event of a frequency drop and/or in the event of a load being connected in. Said overexcited operation means that the guide angle is set such that the infeed current lags the network voltage. Accordingly, the guide angle thus also lags the network phase angle. That can also be referred to such that the guide angle is chosen to be smaller than the network phase angle.

If, in the electrical supply network, a load is then connected in, that is to say if the power consumption abruptly increases, a negative phase jump of the network voltage can occur. The network phase angle can thus change abruptly by a negative value. The network phase angle thus jumps as it were counter to the present infeed phase angle. As a result, the difference angle between the infeed phase angle and the network phase angle decreases and that has the effect that the reactive power component decreases and the active power component increases, namely likewise abruptly.

This results in an instantaneous active power increase, which also has a similar effect to an instantaneous reserve.

The jump of the network phase angle is then also accompanied by a jump of the guide angle, since the latter is defined relative to the network phase angle. The guide angle can essentially also readily jump since it is purely a computational variable. In actual fact, however, it is also varied depending on measurements and by way of a control dynamic range. In this regard, in particular, first the aforementioned jump of the network phase angle must be identified metrologically and the guide angle must be tracked to the network phase angle that has jumped. A guide angle dynamic range can be defined as a dynamic range with which the guide angle reacts to a jump of the network phase angle, and said guide angle dynamic range can have a ramp-up time constant.

Said ramp-up time constant can be defined as for a first order delay/lag (PT1) element, namely as the time required by the guide angle to follow the jump of the network phase angle to 63%. Given the same definition of a ramp-up time constant for the delay dynamic range, that is to say the time in which a step response of the infeed phase angle reaches 63% of the jump, it is proposed that the ramp-up time constant of the delay dynamic range is greater than the ramp-up time constant of the guide angle dynamic range at least by a factor of 5, in particular at least by a factor of 10.

The delay dynamic range with which the infeed angle is tracked to the guide angle in a delayed manner is thus significantly slower than the guide angle dynamic range. The guide angle dynamic range can preferably be disregarded. Specifically, the infeed phase angle is deliberately tracked to the guide angle in a delayed manner, such that the described effect of the abrupt increase in the active power can be maintained. As a result of the load being connected in as described, the difference angle between the network phase angle and the infeed phase angle thus changes, that results in an advantageous effect and, therefore, this changed difference angle is maintained for a period of time, or returned to the earlier value only in a delayed manner. The advantageous effect is better utilized as a result.

In particular, it is proposed that the delay dynamic range has a main time constant in the range of 5 ms to 100 ms. In particular, the time constant can be defined in the sense of a first-order delay element and/or can be defined as the time in which, after a phase jump of the network phase angle, the difference angle between the infeed phase angle and the guide angle is reduced by 63% by the delay dynamic range. In this respect, the main time constant would correspond to the ramp-up time constant of the delay dynamic range as proposed above.

In accordance with one embodiment, it is proposed that the lead angle, in terms of magnitude, is predefined depending on at least one network state.

As network state it is proposed to take account of a local converter penetration. A start-up time constant of the network section can also be taken into account as network state. In particular, it is proposed that the lead angle is chosen to be all the greater, the greater the local converter penetration, and/or the lower the start-up time constant of the network section. Explanations in respect of this will also be found below.

In accordance with one embodiment, it is proposed that the lead angle is set in accordance with at least one of the following specifications, namely one of the following setting specifications.

As one setting specification it is proposed that the lead angle is set to be all the higher, the greater a local converter penetration.

It has been recognized that a high converter penetration reduces a self-stabilization of the electrical supply network or of the relevant network section such as results in particular from physical properties of directly coupled synchronous generators, and that can be counteracted by the setting of the lead angle. Compensation effects which occur as a result of the physics of a directly coupled synchronous generator and achieve corresponding stabilizations of the electrical supply network are therefore present to a lesser extent or not present at all in a network section with high converter penetration.

The greater the lead angle is chosen to be, the greater, too, the difference angle between network phase angle and infeed phase angle in steady-state operation. On account of the nonlinear, namely sinusoidal, relationship between difference angle and active power component, a phase jump of identical angular amplitude with a greater difference angle thus results in a greater effect for active power. If the difference angle jumps, e.g., from 30° to 25°, then the effect on the active power is greater than if it jumps from 10° to 5°.

A local converter penetration denotes the ratio of the active power fed in by all converter-controlled infeed apparatuses connected to the network section to the active power fed in total into the network section or local network section.

A high local converter penetration is present if the active power fed in by all converter-controlled infeed apparatuses connected to the network section amounts to at least 50%, in particular at least 70%, of the active power fed in total into the network section or local network section.

As one setting specification it is proposed that the lead angle is chosen to be all the greater, the lower an average start-up time constant of the network section.

A start-up time constant denotes the time which an infeed apparatus that effects infeed into the electrical supply network requires hypothetically for starting up, that is to say starting. The start-up time constant is a typical property of an infeed apparatus, in particular of the generator used. A start-up time constant of a powerplant with generator is the time which the generator would need at rated torque in order to attain the rated rotational speed (or, conversely, is decelerated from rated rotational speed with the rated torque until the rotational speed is zero). The start-up time constant of rotating loads is determined in the same way.

The average start-up time constant of the network section is thus the arithmetic mean of the individual weighted start-up time constants that are weighted in each case according to the power of the relevant infeed apparatus that is able to be fed in. Given, e.g., only two wind power installations with a first start-up time constant of 2 seconds of a 1 MW wind power installation and a second start-up time constant of 4 seconds of a 2 MW wind power installation, a total time constant $T_{tot}$ thus results from the weighted time constants:

$$T\text{tot}=2*1\text{ MW}/(1\text{ MW}+2\text{ MW})+4*2\text{ MW}/(1\text{ MW}+2\text{ MW})=(2/3+8/3)\text{ s}=10/3\text{ s}=3.33\text{ s}$$

It has been recognized that converter-controlled infeed apparatuses are very fast units which ramp up comparatively quickly. Owing to the decoupling by way of a converter, they do not have an effective start-up time constant in the sense of the definition above. Their start-up time constant can therefore be assumed to be 0 in an idealizing manner; at the very least it is very low.

Consequently, a low average start-up time constant is also an indication of a large proportion of converter-controlled infeed apparatuses in the corresponding network section. In the case of a low average ramp-up time constant, therefore, the influence of a directly coupled synchronous generator, or a plurality thereof, is low, and so this backup effect can be performed at least partly by the converter-controlled infeed apparatuses and accordingly, in order to realize that, the lead angle is chosen to be all the greater, the lower the average start-up time constant. In this context, the lead angle is chosen here, too, such that the guide angle lags the network phase angle.

It is preferably proposed that the lead angle is chosen depending on the average start-up time constant, namely to be all the greater, the lower the time constant, only when the average start-up time constant falls below a predetermined limit value of the average start-up time constant. The predetermined limit value is preferably in the range of 0.5-4 s. It has been recognized that it is only below these values that the dominance of directly coupled synchronous generators declines to such a great extent that a reduced backup effect needs to be counteracted by the choice of a lead angle.

It has been recognized, moreover, that the start-up time constant of the network section can be a measure of a converter penetration, wherein the converter penetration is all the greater, the lower the start-up time constant. In other words, the network section is all the faster, the greater the proportion of converter-controlled infeed apparatuses.

As one setting specification it is proposed that if the network section forms an export zone or import zone, the lead angle is set to be higher by at least one degree than if the network section does not form an export zone or import zone.

The network section forms an export zone if more active power is fed into it than is drawn by connected loads. Excess active power is thus exported into the rest of the electrical supply network, in particular into adjacent network sections.

However, an export zone is present only if the ratio of the active power that is fed into the relevant network section to the active power that is drawn by connected loads exceeds a predetermined limit value, in particular is greater than 1.1. The proportion of exported power must therefore be significant.

For the case where the network section forms an export zone, it has been recognized, in particular, that in such a case a potential backup power as a result of a higher lead angle is advantageous in order, in the case of a disconnection of the network section, to react to the additional power that should be generated to a lesser extent as a result of the abruptly no longer exportable power.

Particularly in the case of a fault-governed disconnection of the network section from the rest of the electrical supply network, a positive jump of the network phase angle can occur, that is to say in the direction of the rotation of the network phase angle.

An enlarged angle between the infeed phase angle and the network phase angle is then established, which can also be referred to as a reaction phase angle. In this case, said reaction phase angle describes the angle between current fed in and the network voltage. The reaction phase angle thus determines the division between active and reactive current or active and reactive power. The power factor $\cos(\phi)$ relates to it. Therefore, it is also important that the converter operates in a current-impressing manner.

The larger reaction angle thus results in an increase in the reactive power component and in a reduction of the active power component. By virtue of the delay dynamic range, this effect is maintained for a time resulting from the choice of the delay dynamic range.

The choice of the lead angle thus results in an instantaneous reduction of the active power fed in if a positive phase jump occurs. That is also referred to as negative backup power.

Specifically, if a disconnection of the network section from the rest of the electrical supply network occurs, in particular from at least one adjacent network section, if the network section under consideration forms an export zone, then that results in an immediate power surplus. That can moreover result in a positive phase jump of the network phase angle. The converter reacts thereto, if a lagging lead angle is set, with an increased reaction angle and thus with a reduction of the power fed in. The excess power is thus instantaneously reduced by a current-impressing converter.

For the case where the network section forms an export zone, it has thus been recognized that in a specific case it is expedient, in particular also when there is a high local converter penetration, to choose the lead angle to be somewhat greater than if the network section under consideration does not form an import zone.

The network section forms an import zone if less active power is fed into it than is drawn by connected loads. Additional active power is thus obtained, that is to say imported, from the rest of the electrical supply network, in particular from adjacent network sections. However, an import zone is present only if the ratio of the active power that is fed into the relevant network section to the active power that is drawn by connected loads falls below a predetermined limit value, in particular is less than 0.9. The proportion of imported power must therefore be significant.

The guide angle lagging the network phase angle thus results in the following effect. If a disconnection of the network section occurs, a negative jump of the network phase angle can occur again, which jump in this case results, however, in a reduction of the absolute value of the angle between network phase angle and guide angle, that is to say in a reduction of the reaction angle. As a result, the reactive power portion decreases and the active power portion increases. The power demand that suddenly occurs as a result of the disconnection can thus instantaneously be covered at least partly. That is also referred to as positive backup power.

As one setting specification the lead angle is set depending on the network frequency. It has been recognized that backup operation, in terms of its quantity, is set depending on the network frequency. It is also taken into consideration here that backup operation is always activated, but the lead angle is chosen depending on the network frequency, that is to say can vary. However, it is also taken into consideration that firstly a decision is actually taken as to whether backup operation is activated, and then the lead angle is set depending on the network frequency in a logical second step.

This is based on the concept, in particular, that the electrical supply network tends to operate more stably in the vicinity of the rated frequency than if the network frequency deviates greatly from the rated frequency. That can be addressed by the choice of the magnitude of the lead angle.

In particular, it is proposed that the lead angle, in terms of the absolute value, is chosen to be all the greater, the further the network frequency is above a rated network frequency, or above a first upper network limit frequency, which identifies an upper frequency value of an insensitivity range around the rated network frequency.

The higher the network frequency, the greater the lead angle is thus chosen to be. In this case, however, it can be provided that in an insensitivity range the lead angle acquires the value zero or is at least not altered, but as the frequency rises the lead angle is increased as soon as the frequency has left, that is to say exceeded, the insensitivity range.

This also takes account of the circumstance that a high frequency in the case of a load drop can result in an even higher frequency and such a jump is thus intended to be counteracted by the method proposed.

As one setting specification it is thus proposed that the lead angle is chosen to be all the greater, the higher the network frequency is above a predetermined upper frequency limit value.

In this respect, the network frequency and the change in the network frequency are further states of the network. They can provide information about a present network behavior to which the infeed apparatus can adapt through the choice of the lead angle. It is proposed to set the magnitude, that is to say the concrete value, of the lead angle in a manner dependent thereon.

It has been taken into account that a higher network frequency may be an indication of a power imbalance in the network, which is regularly combated by an active power adaptation. At the same time it has been recognized that although the change in the lead angle is an active power reduction, an instantaneous active power reaction for backup purposes is made possible as a result.

As one setting specification it is proposed that the lead angle is chosen to be all the greater, the further the network frequency is below a predetermined lower frequency limit value.

It is thus proposed that the lead angle, in terms of the absolute value, is chosen to be all the greater, the further the network frequency is below a rated network frequency, or below the lower frequency limit value, which identifies a lower frequency value of an insensitivity range around the rated network frequency.

A positive backup by way of the choice of overexcited operation has already been described. It has been recognized that also starting from a specific frequency deviation below the rated network frequency and/or starting from a predefinable gradient limit absolute value of a frequency gradient of dropping frequency, it is possible advantageously to activate the backup by way of overexcited operation. Here it has additionally been recognized that a synergistic effect arises according to which a lack of voltage backup resulting from the more slowly running generators can be at least partly compensated for by the measure proposed.

By way of example, a powerplant outage can occur; there may also be some other line outage, thus resulting in a power deficit. The frequency drops as a consequence. It is therefore proposed here, too, to choose the lead angle such that the guide angle lags the network phase angle. As a result of the dropping frequency, the initially lagging guide angle catches up with the network phase angle, such that the reactive power component of the power fed in falls and the active power component rises.

As one setting specification it is proposed that the lead angle is chosen to be all the greater, the greater a change in the network frequency is as soon as, in terms of absolute value, it is above a predetermined upper frequency change limit. It has been recognized here, too, that through a suitable choice of the lead angle it is possible to keep available an instantaneous backup potential by way of active power, which is needed all the more urgently, the faster the frequency changes, that is to say the greater the frequency change.

As one setting specification it is proposed that the lead angle is chosen to be all the greater, the greater a network sensitivity is as soon as it is above a sensitivity limit value.

In this case, the network sensitivity is the ratio of a change in a network variable, in particular the network frequency or the network voltage, as a reaction to a change in a variable affecting the network, in particular an active power or reactive power fed into the network, with respect to the change in the variable affecting the network.

The network sensitivity thus indicates how sensitively the network reacts. It has been recognized in this respect, too, that the lead angle can be chosen to be all the greater, the more sensitive the network, in order thereby to keep available all the more instantaneous backup power. A high network sensitivity is not an indication of a disturbance, but a disturbance can occur more easily, the greater the network sensitivity.

In particular, the network sensitivity NS can be defined by way of the following formula:

$$NS = \Delta P / \Delta V$$

In this case, $\Delta P$ denotes the change in the active power fed in, namely the farm power fed in, and $\Delta V$ denotes the resulting change in the network voltage V.

Alternatively, the network sensitivity NS can be defined by way of the following formula:

$$NS = \Delta Q / \Delta f$$

In this case, ΔQ denotes the change in the reactive power fed in, namely the farm power fed in, and Δf denotes the resulting change in the network frequency f.

In both definitions, these differences are formed over a very short time period, in particular in the range of one second or less. Advantageously, in the formulae, instead of the quotient of the differences, a corresponding derivative can also be used to implement the respective formula.

As one setting specification it is proposed that the lead angle, in terms of its magnitude, in particular in terms of the absolute value in the range of 1° to 30°, is selected depending on a short circuit ratio, in particular is chosen to be all the greater, the lower the short circuit ratio. The magnitude of the angle can be set depending on the magnitude of the short circuit ratio, also abbreviated to SCR. The absolute reaction with which the infeed apparatus reacts to network changes can be defined by the magnitude of the angle. The lower the SCR, the more power must be fed in upon an angular change, and it is therefore proposed that the lead angle, in terms of the absolute value, is chosen to be all the greater, the lower the SCR.

An important criterion when connecting large powerplants to an electrical supply network is the short circuit ratio, which in German linguistic usage, too, among experts is referred to as "Short circuit ratio" and is abbreviated to "Scr" or "SCR". Said short circuit ratio is the ratio of the short circuit power to the connection power. In this case, short circuit power is understood to mean that power which can be provided by the relevant supply network at the network connection point under consideration, to which the powerplant is intended to be connected, if a short circuit occurs there. The connection power is the connection power of the powerplant to be connected, that is to say in particular the rated power of the generator to be connected.

As one setting specification it is proposed that the lead angle, in terms of its magnitude, in particular in terms of the absolute value in the range of 1° to 30°, is chosen depending on at least one further system service of other infeed apparatuses or other control systems that is implemented in the electrical supply network, in particular depending on at least one system service configured as frequency-dependent power control. This is based on the concept, in particular, that the present infeed apparatus is thereby adapted to the system behavior through this dependent choice of the lead angle. By virtue of these system services, which can also be referred to as backup functions, the electrical supply network behaves differently and that can thus be taken into account.

In accordance with one configuration, it is proposed that the guide angle is predefined at the converter output, and the infeed current at the converter output has the infeed phase angle. In addition, it is provided for this purpose that a reactive power phase angle forming a phase angle between the current fed in at the network connection point and the network voltage at the network connection point is present at the network connection point. With respect to these two assumptions it is proposed that the lead angle is predefined with a deviating value with respect to the reactive power phase angle.

The infeed current thus experiences a phase shift, relative to the associated voltage, between the converter output and the network connection point, or the voltage experiences there a phase shift that has an effect as a phase shift between fed-in current and a voltage. The reactive power component changes as a result. In particular, it is therefore the case that the reactive power component at the converter output differs from the reactive power component at the network connection point. In particular, it is possible to provide a reactive power phase angle at the network connection point in order to feed in a desired reactive power there. At the converter output, however, a different angle, namely in particular a different lead angle, is chosen. The lead angle is therefore not chosen for the infeed of a reactive power required at the network connection point, but rather for the purpose of the backup effects explained above.

In particular, it is proposed that the lead angle at the converter output and the reactive power phase angle at the network connection point are predefined with different values, thus resulting in a difference angle between the lead angle and the reactive power phase angle. At the same time, it is furthermore proposed that at least one voltage control device is set and/or connected in between the converter output and the network connection point so as to result in the difference angle between the converter output and the network connection point.

In particular, a phase shifter, in particular by way of a capacitor bank, is taken into consideration as voltage control device. However, a tapped transformer can also be provided. Such a capacitor bank can be controllable in terms of its capacitance. One possibility consists in realizing this by correspondingly changing the interconnection within the capacitor bank, or simply by switching on or off portions of the capacitors of the capacitor bank. Of course, a plurality of independent capacitors or capacitor banks can also be provided, which however then act analogously like a variable capacitor bank.

In accordance with one embodiment, it is proposed that at least one voltage control device is provided in order to vary the network voltage at the network connection point. At the same time, it is provided that the at least one voltage control device controls the network voltage such that voltage deviations of the network voltage at the network connection point from a predefinable setpoint voltage, caused by deviations between the lead angle and the reactive power phase angle, are at least partly adjusted or corrected.

Predefining the lead angle results in a phase difference between the infeed current and the network voltage. That can result in the infeed of a reactive power, which can in turn result in a change in the network voltage at the network connection point. However, the lead angle is not predefined such that a setpoint voltage that is predefinable at the network connection point is complied with, rather the lead angle is predefined so as to give rise to the above-described effects as a reaction to a voltage change, in particular a voltage jump. The predefinition of the lead angle thus results in a network voltage at the network connection point which does not correspond to the predefinable setpoint voltage. Corresponding voltage deviations between the network voltage at the network connection point and the predefinable setpoint voltage thus result.

These deviations could be corrected or adjusted by altering the lead angle. However, the lead angle is not intended to be altered. It is therefore proposed instead to control the network voltage using the voltage control device such that the voltage deviations mentioned are at least partly adjusted or corrected. For this purpose, for example, capacitor banks can be provided between the converter-controlled infeed apparatus and the network connection point. The control deviation mentioned can thereby be counteracted.

However, such a voltage control device need not be arranged between the converter-controlled infeed apparatus and the network connection point. By way of example, consideration is also given to carrying out a control of the network voltage at the network connection point by way of a tapped transformer arranged in the relevant network section, that is to say downstream of the network connection point from the point of view of the converter-controlled infeed apparatus.

What can be achieved thereby is that the lead angle can be set in a targeted manner for achieving the effects described above, but resulting voltage deviations can be adjusted or corrected in some other way.

In accordance with one embodiment, it is proposed that the voltage control device is set depending on the lead angle. As a result, even a voltage deviation owing to the lead angle can be addressed directly. The values as to how the voltage control device is to be set can be predetermined and can be set for example in a fixedly predefinable manner depending on the present lead angle. In this case, an open-loop control would be present, which can also adjust voltage deviations of the network voltage.

Alternatively, however, a closed-loop control with a corresponding feedback can also be used, in the case of which for example a setpoint/actual value comparison between the network voltage at the network connection point and the predefinable setpoint voltage is carried out and the voltage control device is controlled in a manner dependent thereon.

A plurality of voltage control devices can also be provided, of course, which can be combined into one voltage control device here on account of their functional task even with structural separation.

The voltage deviations do not have to be completely corrected. As a result, it is possible for example to avoid situations in which, when there is only a small voltage deviation at two network connection points of two converter-controlled infeed apparatuses, the voltage control of these two infeed apparatuses mentioned by way of example respectively works against each other, in order to precisely correct a voltage.

In accordance with one embodiment, it is proposed that the at least one voltage control device is at least one device selected from the list comprising a capacitor bank having settable capacitance values, a tapped transformer and an inductor. The voltage control device can thus be, in particular, a capacitor bank having settable capacitance values. Additionally or alternatively, a voltage control device can be a tapped transformer and, additionally or alternatively, a voltage control device can be an inductor.

Phase shifts of the AC voltage signal can be achieved by means of a capacitor bank. By virtue of the settability of the capacitance values, the phase shift can thus also be made settable. By virtue of the phase shift resulting in an angle between fed-in current and network voltage at the network connection point, reactive current can thus be set and voltage influencing can be carried out as a result.

A tapped transformer can be arranged between the converter-controlled infeed apparatus and the network connection point or between the network connection point and a further section in the electrical supply network. In the second case, in particular, the tapped transformer can directly change a voltage in the network section in which it is connected.

By means of an inductor, a phase shift can likewise be performed and, in the case of a settable inductor, can be set as well. Such an inductor is arranged, in particular, between the converter-controlled infeed apparatus and the network connection point in order to result in the phase shift there, which in turn has effects at the network connection point.

In accordance with one embodiment, it is proposed that the delay dynamic range has a main time constant, and the main time constant is chosen in the range of 10 ms to 100 ms. Such a main time constant, which would thus be the sole time constant in the case of a first-order delay function, substantially determines the dynamic range or speed with which the infeed phase angle is tracked to the guide angle. The main time constant can also be referred to as the largest time constant. In transient operation, for example, a single phase jump of the network phase angle can occur, such that correspondingly one phase jump of the guide angle arises as well. Afterward, operation can be continued normally again by both the phase angle and the guide angle rotating synchronously with the network frequency again. Consequently, steady-state operation is then present again.

Since a difference angle between the infeed phase angle and the guide angle is corrected to zero in steady-state operation, the guide dynamic range, and thus also the main time constant, thus describes how or how quickly in the aforementioned case of the phase jump the infeed phase angle is tracked to the guide angle that has correspondingly jumped. In the case of the aforementioned jump of the phase angle, a jump of the difference angle between the infeed phase angle and the guide angle thus results. The guide dynamic range can thus be characterized or described by the behavior of said difference angle with respect to the aforementioned phase jump. The profile of the difference angle thus forms a step response in the control engineering sense. The time constant, in particular the main time constant, describes the dynamic range of said step response.

In particular, it is proposed that the delay dynamic range is configured as a first-order or second-order delay function. In the case of a first-order delay function, the main time constant thus identifies the time in which the difference angle has decreased by 63% again after the jump. The main time constant for the second-order delay function can also be defined in the same or a similar way. In particular, it is proposed that the second-order delay function is selected such that it has no overshoots. Thus, a step response then approaches the end value asymptotically.

What can thus be achieved with such a delay dynamic range is that in steady-state operation, after a short correction time, the infeed phase angle corresponds to the guide angle. The lead angle then describes the difference angle between infeed phase angle and network phase angle. If a phase jump occurs in the network, the guide angle thus immediately jumps as well, but not the infeed phase angle. A totally different angle between infeed phase angle and network phase angle thus arises for a moment that is predefined by the main time constant. That results in the effects already described.

A first-order delay function is distinguished, in particular, by the fact that it itself is free of oscillations and is therefore well suited as a dynamic range for the purpose of tracking. Its step response approaches the end value asymptotically.

The second-order delay function can be set to be free of oscillations or at least to have few oscillations. It has the advantage, moreover, that it initially does not immediately rise or fall and as a result the difference angle firstly is maintained substantially at the value established after the phase jump. In that case, however, the difference angle can be brought to the value zero asymptotically with the second-order delay function. The difference angle can be brought to its new value, namely the value zero, asymptotically in the case of the first-order delay function, too.

In accordance with one configuration, it is proposed that an operating mode in which the infeed phase angle is tracked to the guide angle with the delay dynamic range is provided as a backup operating mode, and the backup operating mode is activated depending on the network frequency and/or the network phase angle. Here it has been recognized, in particular, that a stable or less stable state of the electrical supply network can be present depending on the frequency. Moreover, it has been recognized that the type of proposed network backup by way of the delayed tracking of the infeed phase angle depending on the network frequency can manifest different effects or depending on the network frequency situations with different degrees of criticality can occur, for which the proposed backup operating mode would be expedient.

In particular, the backup operating mode is activated if the network frequency is above a predefinable trigger frequency, the network frequency rises with a frequency gradient that is above a predefinable trigger gradient, and/or the network frequency jumps by a value that is above a predefinable frequency jump level.

At a high network frequency, the latter can become even higher as a result of sudden discontinuation of a load. Consequently, the backup operating mode can therefore be activated as a precaution.

If the network frequency rises with a high frequency gradient, there is likewise the risk of an even higher frequency being attained as a result of the discontinuation of a load. In respect of this, too, a backup operating mode can be activated as a precaution since, in terms of control engineering, it is possible to set the guide angle and infeed phase angle more quickly than the network frequency changes. The criteria as to whether the network frequency is above a predefinable trigger frequency or the network frequency rises with a frequency gradient that is above the predefinable trigger gradient can also be combined, specifically by the backup operating mode being activated when at least one of the two criteria is satisfied. If both criteria are satisfied, the backup operating mode likewise is or remains activated.

Preferably, the backup operating mode is activated if the network phase jumps; a critical case can then likewise be present in which the network phase jumps further again for example as a result of discontinuation of a load. In order to prevent that, a backup operating mode can be activated. Consideration is given here to an additional or alternative activation of the backup operating mode depending on the criterion of whether the network phase jumps by a value that is above a predefinable phase jump level. The activation can then be performed if at least one of the criteria is satisfied.

Provided is an infeed apparatus, in particular a wind power system, for feeding electrical power into an electrical supply network at a network connection point, wherein
the network connection point is arranged at a network section of the electrical supply network and the electrical power is fed into the network section via the network connection point,
the electrical supply network has a network voltage having a network frequency and a network phase angle rotating with the network frequency and is characterized by a rated network frequency,
the infeed apparatus comprises at least one converter,
the converter has a converter output for outputting an output current, and
the converter operates in a current-impressing manner, wherein
a control device (controller) is provided, which is prepared to control the infeed such that
an infeed current is generated by the converter with an infeed phase angle rotating with the network frequency, for the purpose of controlling the infeed phase angle, a guide angle rotating with the network frequency is predefined, wherein the guide angle has a predefinable lead angle with respect to the network phase angle, such that the guide angle lags the network phase angle by the lead angle, and
the infeed phase angle is tracked to the guide angle with a delay dynamic range, wherein
the delay dynamic range is configured such that
in steady-state operation, when the guide angle and the network phase angle rotate uniformly with the network frequency, a difference angle between the infeed phase angle and the guide angle is corrected to zero, and
in transient operation, when a time derivative of the guide angle changes, the infeed phase angle is tracked to the guide angle with a variable deviation.

In particular, such an infeed apparatus, in particular specifically a wind power system, that is to say a wind power installation or a wind farm, is prepared to operate in a manner such as has been explained above on the basis of the embodiments of the infeed method. In particular, the control device (controller) is provided for correspondingly controlling the infeed apparatus. In particular, the converter is correspondingly controlled. The converter can be configured as a frequency converter or frequency inverter.

The advantages that have been explained above in association with the methods in accordance with at least one embodiment can thus be achieved. In particular, what can be achieved is that wind power systems, that is to say wind power installations or wind farms, advantageously back up the electrical supply network even further, namely in particular even in the case of phase jumps can provide a quasi instantaneous reaction which has the effect of backing up a network and/or stabilizing a network.

BRIEF DESCRIPTION OF THE SEVERAL VIEWS OF THE DRAWINGS

The invention will now be explained in greater detail below by way of example with reference to the accompanying figures.

DETAILED DESCRIPTION

Figure 1:
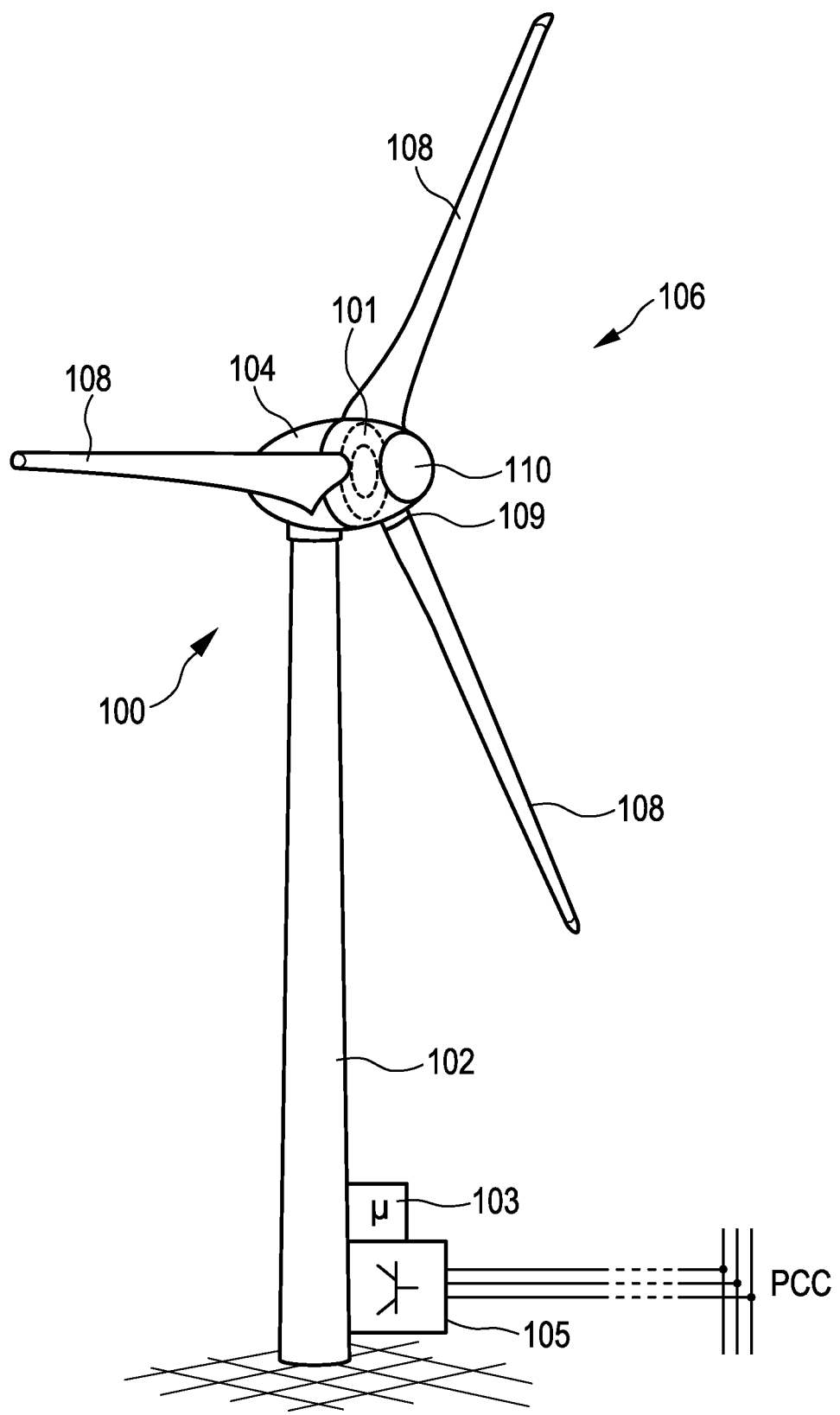
FIG. 1 shows a wind power installation in a perspective illustration.

FIG. 1 shows a schematic illustration of a wind power installation. The wind power installation 100 comprises a tower 102 and a nacelle 104 on the tower 102. An aerodynamic rotor 106 comprising three rotor blades 108 and a spinner 110 is provided on the nacelle 104. The aerodynamic rotor 106 is caused to effect a rotational movement by the wind during operation of the wind power installation and thereby also rotates an electrodynamic rotor of a generator, which is coupled to the aerodynamic rotor 106 directly or indirectly. The electrical generator is arranged in the nacelle 104 and generates electrical energy. The pitch angles of the rotor blades 108 can be varied by pitch motors on the rotor blade roots 109 of the respective rotor blades 108.

In this case, the wind power installation 100 comprises an electrical generator 101, indicated in the nacelle 104. Electrical power can be generated by means of the generator 101. An infeed unit 105, which can be configured as an inverter, in particular, is provided for feeding in electrical power. It is thus possible to generate a three-phase infeed current and/or a three-phase infeed voltage according to amplitude, frequency and phase, for infeed at a network connection point PCC. That can be effected directly or else jointly with further wind power installations in a wind farm. An installation controller 103 is provided for controlling the wind power installation 100 and also the infeed unit 105. The installation controller 103 can also acquire predefined values from an external source, in particular from a central farm computer.

Figure 2:
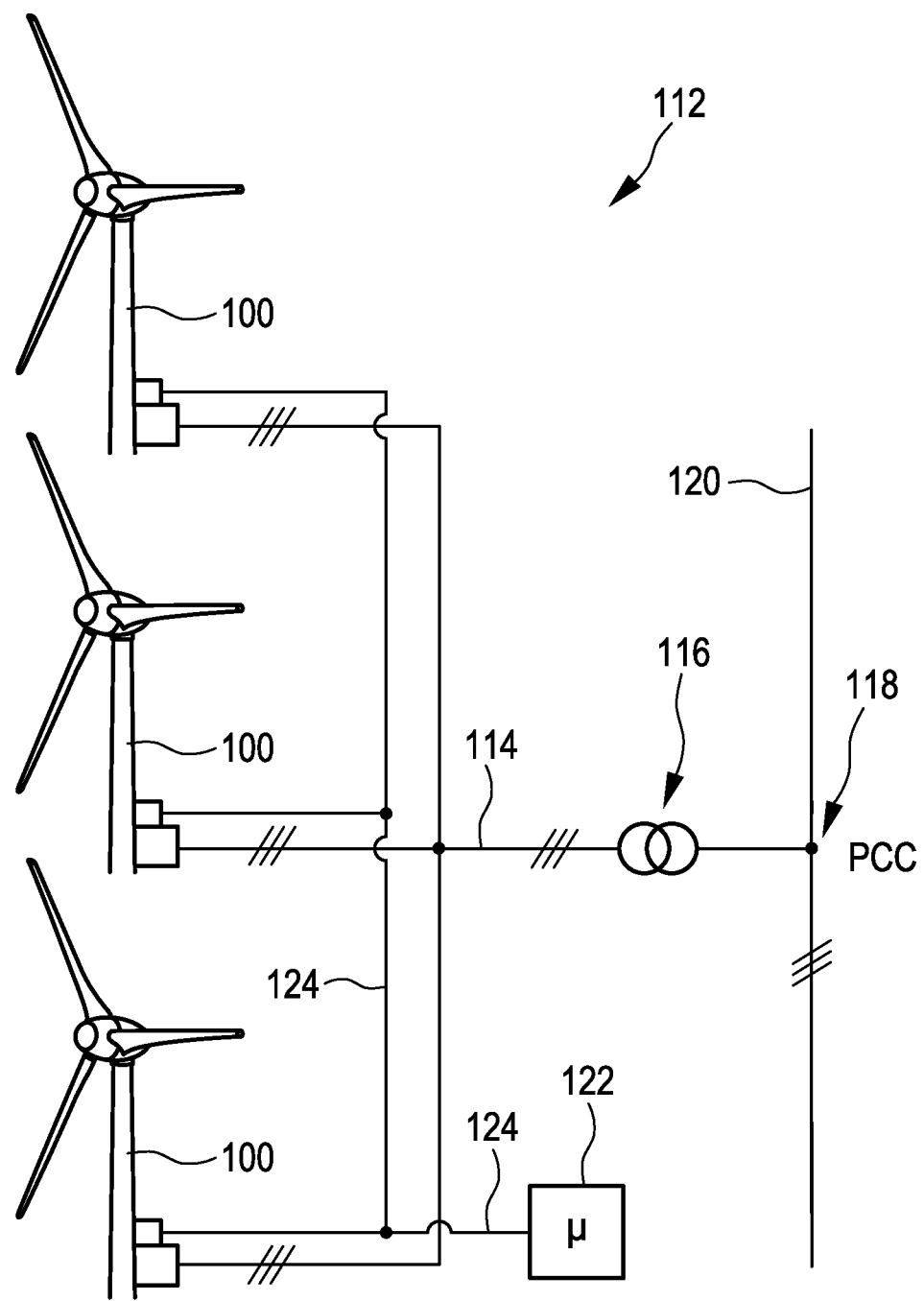
FIG. 2 shows a wind farm in a schematic illustration.

FIG. 2 shows a wind farm 112 comprising for example three wind power installations 100, which can be identical or different. The three wind power installations 100 are thus representative of basically an arbitrary number of wind power installations of a wind farm 112. The wind power installations 100 provide their power, namely in particular the generated current, via an electrical farm network 114. In this case, the respectively generated currents or powers of the individual wind power installations 100 are added and a transformer 116 is usually provided, which steps up the voltage in the farm in order then to feed it into the supply network 120 at the infeed point 118, which is also generally referred to as PCC. FIG. 2 is merely a simplified illustration of a wind farm 112, which for example does not show a controller, even though a controller is present, of course. Moreover, by way of example, the farm network 114 can be configured differently, with for example a transformer also being present at the output of each wind power installation 100, to mention just one different exemplary embodiment.

The wind farm 112 additionally comprises a central farm computer 122. The latter can be connected to the wind power installations 100 via data lines 124, or in a wireless manner, in order thereby to exchange data with the wind power installations and in particular to acquire measured values from the wind power installations 100 and to transmit control values to the wind power installations 100.

Figure 3:
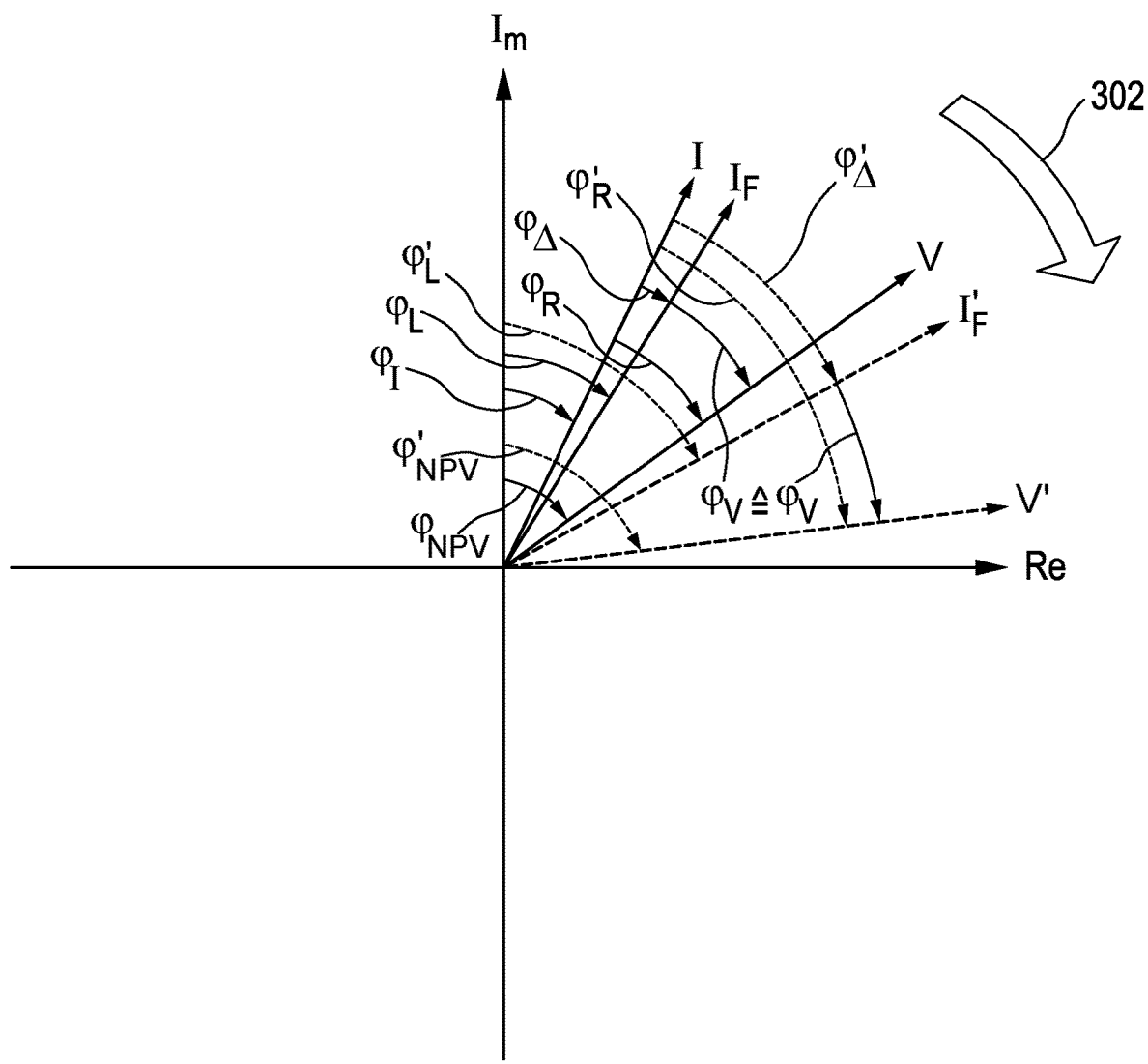
FIG. 3 illustrates relevant angles in a complex phasor representation.

FIG. 3 shows, in a complex phasor representation, a voltage phasor V, a current phasor I and an auxiliary phasor $I_F$. These three phasors respectively represent an instantaneous value of an AC voltage or AC current. The three phasors rotate substantially with network frequency. In this case, the instantaneous angular position of the voltage phasor is identified by the network phase angle $\varphi_{NPV}$. The voltage, in particular the network voltage, thus rotates with this phasor and thus with the network phase angle $\varphi_{NPV}$. The rotation round to the right is indicated symbolically by the rotation arrow 302.

The auxiliary phasor $I_F$, with regard to its angular position, is defined with respect to the voltage phasor V. Specifically, here it lags the voltage phasor V by the lead angle $\varphi_V$.

At all events the auxiliary phasor $I_F$ rotates with a guide angle $\varphi_L$. The respective present guide angle $\varphi_L$ can thus be calculated from the present network phase angle $\varphi_{NPV}$ minus the lead angle $\varphi_V$.

The current to be fed in, that is to say the infeed current, can be predefined or designated by the current phasor I. The current phasor I is characterized by the infeed phase angle $\varphi_I$. The current phasor I likewise rotates with network frequency, such that its infeed phase angle $\varphi_I$ also rotates correspondingly. In the ideal steady-state case, the current phasor I and the auxiliary phasor $I_F$ lie one above the other, that is to say are identical. In a transient case, that is to say if the ideal steady-state case has not yet been attained, the current phasor I is tracked to the auxiliary phasor $I_F$. That can also be referred to synonymously as matched, since the tracking process does not have to relate to the rotation direction in accordance with the rotation arrow 302.

That is the case in the variant shown in FIG. 3, however; there the current phasor is tracked to the auxiliary phasor $I_F$ actually in the direction of the rotation arrow 302. A difference angle $\varphi_A$ results, which is intended to be corrected toward zero in order to attain the steady state.

A reaction angle thus results as the sum of the difference angle $\varphi_A$ and the lead angle $\varphi_V$. Said reaction angle corresponds to the lead angle $\varphi_V$ in the steady state, but in the case of a reaction to a phase jump said reaction angle $\varphi_R$ deviates from the lead angle $\varphi_V$, namely by the difference angle $\varphi_A$. In this respect, the reaction angle $\varphi_R$ represents a reaction to a phase jump as long as the difference angle has not yet been completely corrected.

FIG. 3 thus shows illustratively an instantaneous situation in which the difference angle has not yet been entirely corrected to zero, that is to say that the current phasor I does not yet completely correspond to the auxiliary phasor $I_F$. Although the situation in FIG. 3 is only shown in one quadrant, these current phasors carry on rotating continuously. Only the lead angle $\varphi_V$ is constant and the difference angle $\varphi_A$ changes only little, namely with a delay dynamic range with which it is regulated toward zero or with which the current phasor I is tracked to the auxiliary phasor $I_F$. Accordingly, the infeed phase angle $\varphi_I$ is also tracked to the guide angle $\varphi_L$ continuously because both current phasors and thus both angles rotate continuously. However, the tracking is effected such that the difference angle $\varphi_A$ is regulated to zero. This ideal steady state has not yet been attained, however, at the point in time depicted in FIG. 3.

A phase jump and its effects are illustrated by dashed lines in FIG. 3. In this case, it is firstly assumed that the phase of the network voltage jumps, and so the network phase angle $\varphi_{NPV}$ thus jumps. The result is then the changed, i.e., jumped, voltage phasor U', with respect to which a jumped network phase angle $\varphi_{NPV}'$ thus results.

The lead angle $\varphi_V$ does not change, but is then applied to the new voltage phasor, i.e., the changed voltage phasor V', and is thus applied to the changed network phase angle $\varphi_{NPV}'$. Accordingly, a jumped or changed guide angle $\varphi_L'$ and thus a corresponding jumped or changed auxiliary phasor $I_F'$ result. The auxiliary phasor and thus also the guide angle can follow this changed situation substantially immediately and thus without delay because it is basically only a computational variable. Possible dynamic ranges that might occur and have been explained above can be disregarded at least for illustration purposes.

The current phasor I, however, represents the current actually fed in. Although it could also be tracked following the phase jump without an appreciable delay in the new situation since it is generated by a converter, that is to say a frequency converter or a frequency inverter, it is deliberately not immediately tracked here. Instead, the current phasor I and thus the infeed phase angle $\varphi_I$ are tracked to the changed auxiliary phasor $I_F'$ and the changed guide angle $\varphi_L'$, respectively, with a delay dynamic range. Directly after the jump, the infeed situation of the infeed current thus remains substantially unchanged. The infeed current, identified here by the current phasor I, thus continues to be fed in with the same sine function as before, without a phase jump. The current phasor I thus carries on rotating with the network frequency. Only gradually does the current phasor I match the changed auxiliary phasor $I_F'$.

The following effect is established then. By virtue of the fact that the infeed current and thus representatively the current phasor I is not immediately matched to the phase jump of the network voltage, a comparatively large reaction angle $\varphi_R'$ is established. It increases at all events in the example shown. It would decrease in the case of an opposite jump direction.

On the basis of the illustrated situation in FIG. 3, the reaction angle $\varphi_R$ thus increases to the changed reaction angle $\varphi_R'$. The current fed in thus has a greater phase shift with respect to the network voltage than before. That has the effect that the active power fed in decreases and the reactive power fed in increases. The phase jump thus results in an instantaneous increase in the reactive power, which results in an increased voltage backup. Moreover, it results in a reduction of the active power, which likewise has a backup effect since the phase jump illustrated can arise on account of the discontinuation of a load. If a load is discontinued, the active power accepted thus decreases and the converter-controller infeed apparatus thus reacts to this instantaneously with a reduction of the active power fed in, in accordance with the situation shown in FIG. 3.

Provided herein are open-loop and closed-loop control strategies for wind energy installations and of other power electronically coupled infeed apparatuses in order to provide voltage-impressing properties in parallel network operation.

In particular, it is possible to achieve an increase in the converter-based generation proportion in interconnected networks. The intention as far as possible is to propose a development of a control concept for networks which at times are driven almost completely by converter-controlled infeed, as far as possible without curtailments of system safety.

It has been recognized that conventional powerplants, that is to say powerplants with directly coupled synchronous machines, physically have voltage-impressing properties. Since most infeed apparatuses involving renewables do not have directly coupled synchronous machines, or use thereof is not expedient from other standpoints, these physical properties will not be available in the future.

The proposed concept enables the required proportion of voltage-impressing systems during operation in interconnected networks to be reduced further, or perhaps even brought to zero in the ideal case.

It has been recognized that purely voltage-impressing infeed apparatuses have to be overdimensioned in terms of performance compared with current-impressing systems. It has been recognized that an overdimensioning by approximately 50% is necessary in order to permit phase jumps of 30°.

This can be avoided, at least in part, with the concept shown here.

It has also been recognized that the development of a control for purely voltage-impressing infeed apparatuses requires resources. The control concept is very different than today's typical converter-controlled infeed apparatuses. That can likewise be avoided with the concept.

At all events the proposed solution achieves a voltage-impressing effect in certain situations, but without otherwise being designed in a voltage-impressing manner. This means, therefore, that a customary control concept can otherwise continue to be used.

The following aspects have also been recognized and utilized:

Since converters can be changed very rapidly at the operating point, even within the time constant of a frequency change in the network, e.g., the forced overexcited operating mode can be activated starting from a specific underfrequency, and the forced overexcited operating mode can likewise be activated at an overfrequency.

An overexcited operating mode, which can also be referred to as overexcited driving mode, describes an operating mode in which the guide angle lags the network phase angle. Thus, in the event of loads being connected in, frequency dips or phase jumps, a positive backup power is fed into the network.

If such an operating mode is not possible on account of voltage and reactive power limitations, a converter system can also operate in combination with passive components, such as, e.g., inductors and/or tapped transformers in combination with an overexcited driving mode. As a result, for example, the converter system can be operated in an overexcited operating mode, without forbidden voltage band violations occurring. It has been recognized that as a result of the overexcited operating mode, that is to say if overexcited driving is effected, supplementary aids can be used in order to carry out a voltage control, in particular in order to keep the voltage in a predefined band. That can be achieved by means of a tapped transformer, which then forms such an aid.

In the case, too, of drifting away, in particular rapid drifting away, of the frequency, as a result of the rapid detection starting from a specific frequency deviation, the phase angle of the current of the wind power installation can "overtake" the voltage angle in order to provide the properties. Drifting away, in particular rapid drifting away, of the frequency in the direction of lower frequencies can be referred to as a state in which the infeed power is fed in in an overexcited manner.

This functionality is utilized here and can be referred to as a $\varphi(f)$ control.

The invention claimed is:

1. A method for feeding electrical power into an electrical supply network at a network connection point, comprising:
   feeding, at the network connection point, the electrical power into a network section of the electrical supply network, wherein:
      the electrical supply network has a network voltage,
      the network voltage has a network frequency and a network phase angle that is a phasor rotating with the network frequency,
      the electrical supply network is associated with a rated network frequency,
      feeding the electrical power is performed by a converter,
      the converter has a converter output for outputting an output current, and
      the converter operates in a current-impressing manner;
   generating, by the converter, an infeed current with an infeed phase angle that is a phasor rotating with the network frequency;
   predefining a guide angle that is a phasor rotating with the network frequency for controlling the infeed phase angle, wherein the guide angle has a predefinable lead angle with respect to the network phase angle such that the guide angle lags the network phase angle by the lead angle;
   causing the infeed phase angle to track the guide angle with a dynamic range delay; and
   configuring the dynamic range delay such that:
      in steady-state operation, when the guide angle and the network phase angle rotate uniformly with the network frequency, a difference angle between the infeed phase angle and the guide angle is set to zero, and
      in transient operation, when a time derivative of the guide angle changes, the infeed phase angle tracks the guide angle with a variable deviation.

2. The method as claimed in claim 1, wherein the method is performed by a converter-controlled infeed apparatus.

3. The method as claimed in claim 2, wherein the converter-controlled infeed apparatus is a wind power system.

4. The method as claimed in claim 1, comprising:
defining a magnitude of the lead angle depending on at least one network state.

5. The method as claimed in claim 1, comprising:
setting the lead angle in accordance with at least one setting specification from a list of the setting specifications including:
the lead angle is set to be positively correlated with a local converter penetration;
the lead angle is set to be negatively correlated with an average start-up time constant of the network section;
the lead angle is set to be higher by at least one degree in response to the network section forming an export zone or import zone than in response to the network section not forming an export zone or import zone;
the lead angle is set depending on the network frequency;
the lead angle is set to be positively correlated with an amount by which the network frequency exceeds a predetermined upper frequency limit value;
the lead angle is set to be positively correlated with an amount by which the network frequency drops below a predetermined lower frequency limit value;
the lead angle is set to be positively correlated with an absolute value of a change in the network frequency occurring when the network frequency exceeds a predetermined upper frequency change limit;
the lead angle is set to be positively correlated with a network sensitivity occurring when the network sensitivity is above a sensitivity limit value;
the lead angle has a magnitude having an absolute value in the range of 1° to 30°;
the lead angle has the magnitude having the absolute value in the range of 1° to 30° and the lead angle is set depending on a short circuit ratio;
the lead angle has the magnitude having the absolute value in the range of 1° to 30°, the lead angle is set depending on the short circuit ratio and the lead angle is set to be negatively correlated with the short circuit ratio;
the lead angle has the magnitude having the absolute value in the range of 1° to 30°, and the lead angle is set depending on at least one further system service of other infeed apparatuses or other control systems implemented in the electrical supply network; and
the lead angle has the magnitude having the absolute value in the range of 1° to 30°, and the lead angle is set depending on the at least one further system service of the other infeed apparatuses or other control systems implemented in the electrical supply network, and the lead angle is set depending on at least one system service configured as frequency-dependent power control.

6. The method as claimed in claim 1, wherein:
the guide angle is predefined at the converter output, and the infeed current at the converter output has the infeed phase angle,
a reactive power phase angle representing a phase angle between the current fed in at the network connection point and the network voltage at the network connection point is present at the network connection point, and
the lead angle is predefined with a deviating value with respect to the reactive power phase angle.

7. The method as claimed in claim 1, wherein:
the lead angle at the converter output and a reactive power phase angle at the network connection point are predefined with different values resulting in a difference angle between the lead angle and the reactive power phase angle, and
at least one voltage control device is set and/or connected between the converter output and the network connection point so as to result in the difference angle between the converter output and the network connection point.

8. The method as claimed in claim 1, wherein:
at least one voltage control device is provided in order to vary the network voltage at the network connection point,
the voltage control device controls the network voltage such that voltage deviations of the network voltage at the network connection point from a predefinable setpoint voltage, caused by deviations between the lead angle and a reactive power phase angle, are at least partly adjusted or corrected, and/or
the voltage control device is set depending on the lead angle.

9. The method as claimed in claim 8, wherein the at least one voltage control device is at least one device selected from a list including:
a capacitor bank having settable capacitance values,
a tapped transformer, and
an inductor.

10. The method as claimed in claim 1, wherein:
the dynamic range delay has a main time constant, and
the main time constant is in the range of 10 ms to 100 ms.

11. The method as claimed in claim 10, wherein the dynamic range delay is a first or second order delay function.

12. The method as claimed in claim 1, wherein:
an operating mode in which the infeed phase angle tracks the guide angle with the dynamic range delay is provided as a backup operating mode, and
the backup operating mode is activated depending on the network frequency and/or the network phase angle.

13. The method as claimed in claim 12, wherein the backup operating mode is activated in response to:
the network frequency being above a predefinable trigger frequency,
the network frequency increasing with a frequency gradient that is above a predefinable trigger gradient, and/or
the network phase angle jumping by a value that is above a predefinable phase jump level.

14. An infeed apparatus for feeding electrical power into an electrical supply network at a network connection point, comprising:
a converter including:
a converter output configured to output an output current, wherein the converter is configured to operate in a current-impressing manner, wherein the network connection point is arranged at a network section of the electrical supply network and the electrical power is fed into the network section via the network connection point, and wherein the electrical supply network has a network voltage having a network frequency and a network phase angle that is a phasor rotating with the network frequency and is characterized by a rated network frequency; and
a controller configured to control feeding the electrical power such that an infeed current generated by the converter with an infeed phase angle that is a phasor rotating with the network frequency, wherein a guide angle that is a phasor rotating with the network frequency is predefined for controlling the infeed phase angle, wherein the guide angle has a predefinable lead angle with respect to the network phase angle such that the guide angle lags the network phase angle by the lead angle, wherein the infeed phase angle tracks the guide angle with a dynamic range delay, and wherein the dynamic range delay is configured such that:
- in steady-state operation, when the guide angle and the network phase angle rotate uniformly with the network frequency, a difference angle between the infeed phase angle and the guide angle is set to zero, and
- in transient operation, when a time derivative of the guide angle changes, the infeed phase angle tracks the guide angle with a variable deviation.

15. The infeed apparatus as claimed in claim 14, wherein the infeed apparatus is a wind power system.

\* \* \* \* \*